Oct. 1, 1968   P. A. MUTCHLER   3,403,670
LIQUID FIRED COOKING APPARATUS
Filed March 2, 1967

INVENTOR.
Paul A. Mutchler
BY Edward M. Steutermann

United States Patent Office 3,403,670
Patented Oct. 1, 1968

3,403,670
LIQUID FIRED COOKING APPARATUS
Paul A. Mutchler, University City, St. Louis, Mo., assignor to American Air Filter Company, Inc., Louisville, Ky., a corporation of Delaware
Filed Mar. 2, 1967, Ser. No. 620,001
7 Claims. (Cl. 126—44)

ABSTRACT OF THE DISCLOSURE

A cooking apparatus including a heat source adapted to burn liquid fuel where the temperature of the cooking surface is maintained within selected limits by regulating the quantity of ambient air mixed with the products of combustion emitted from the heat source.

Cross-reference to related applications

Figure 1:
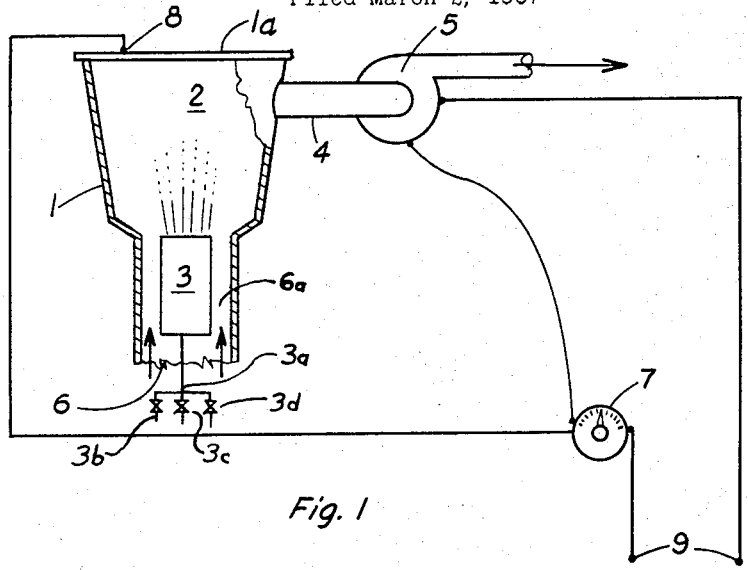

This application relates, in part, to my co-pending application Ser. No. 557,493, filed June 14, 1966.

Background of the invention

Cooking temperatures usually range from slightly less than 200° F. to about 600° F. depending on the method of cooking and the food to be prepared. The temperature of the gases emitted from liquid fuel burning heat sources generally are greatly in excess of 600° F. so cooking surfaces cannot be directly exposed to the products of combustion of such heat sources. In some previous cooking devices the cooking surfaces have been insulated from the high temperature gas stream and the heat has been distributed to the cooking surface at a lower temperature, for example by providing heavy metallic framework in direct contact with the gas stream to conduct the heat to the cooking surface to moderate the excessive temperature of the gas stream emitted from the combustion source. Distribution of heat through the heavy framework reduces the temperature at the cooking surface to a level normally associated with the preparation of food but excessive heat loss makes such arrangements inherently inefficient. Furthermore, such previous arrangements have been undesirable because of the weight of the cooking device and because heat retained by the metallic framework, or other heat insulating means, adversely affects the responsiveness of the cooking temperature to change in the rate of fuel provided to the heat source. Because of the heat retained in the framework, in such previous apparatus a significant amount of time is required to change from one cooking temperature to another and temperature control has been poor.

Furthermore, previous cooking devices with liquid fuel burning heat sources have required complicated and expensive mechanical or hydraulic valve means to modulate the flow of fuel to the burning device over a rather wide range of flow rates to control the temperature of the cooking surface. Generally, very small quantities of fuel are consumed and it is extraordinarily difficult to accurately meter such small quantities of fuel over a normal range of cooking temperatures so temperature control has been poor.

Summary of the invention

The present invention provides a cooking arrangement including a liquid fuel burning heat source where the temperature of the cooking surface is easily controlled within selected limits in a straightforward manner without complicated means for continuous modulation of a very small flow of fuel to the heat source.

Furthermore, the present invention provides a lightweight cooking arrangement having a liquid fuel burning heat source where the heat generated by the combustion source is rapidly and efficiently distributed over a cooking surface to provide a selected temperature at the cooking surface without significant loss of useful heat.

Moreover, the present invention provides a cooking device where the temperature of the cooking surface is controlled without the use of bulky insulating means or heavy framework to distribute the heat and the cooking surface temperature can be rapidly and efficiently changed in a very short time.

Various other features of the present invention will become obvious to one skilled in the art upon reading the disclosure set forth hereinafter.

More particularly, the present invention provides a cooking device including: a casing defining a chamber where the casing has one wall which is used as a heat transfer surface for cooking food, an outlet opening communicating with the chamber, and an inlet opening communicating with the chamber; liquid fuel burning combustion means cooperatively disposed to direct heated gases and combustion products into the chamber; fan means to provide air to the chamber; and, cooking surface temperature control means to selectively control the temperature at the surface including temperature responsive means to regulate the supply of air to the inlet means in response to change in temperature at the cooking surface.

It is to be realized that the description of one example of the present invention given herein is not by way of limitation and that various changes can be made in the arrangement, form or configuration of the apparatus disclosed herein without departing from the scope or spirit of the present invention.

Figure 2:
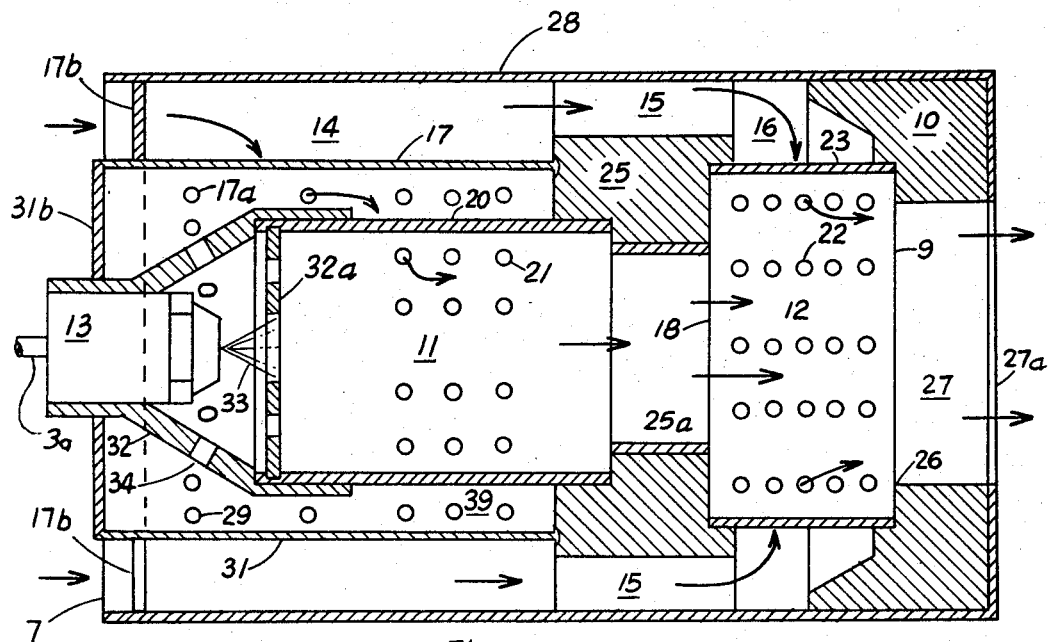

Referring now to the figures:

FIGURE 1 is a schematic diagram of an example of a cooking device in accordance with the present invention; and, FIGURE 2 is a view, in section, of a liquid fuel burning combustor which can be used in a cooking device in accordance with the present invention.

FIGURE 1 shows an example of one arrangement provided by the present invention including a casing 1 defining a plenum 2 where casing 1 has a controlled temperature heat transfer surface 1a as hereinafter described. Casing 1 also includes an exhaust conduit 4 and an inlet 6 with a liquid fuel burning combustor 3 cooperatively disposed in inlet 6. An induced draft fan 5 is provided to supply air to combustor 3 and withdraw gases from chamber 2 by drawing air through inlet 6 at a controlled rate in response to temperature at heat transfer 1a. Except for inlet 6 and outlet 4, casing 1 can, advantageously, be sealed to prevent excape of gases from chamber 2 to the area adjacent heat transfer surface 1a and the sides of casing 1 can be insulated to prevent undesirable loss of heat from chamber 2 to the atmosphere.

Casing 1 can include one inlet for the combustor and a separate inlet for an additional air passage to provide tempering air to be mixed with products of combustion from combustor 3, or as in the example of FIGURE 1, inlet 6 can advantageously be made large enough to accommodate combustor 3 and provide an annular air inlet passage 6a between the combustor 3 and the inlet of casing 1. In the example of FIGURE 1 a portion of the air drawn into inlet 6 by fan 5 is supplied to combustor 3 and the rest flows through opening 6a to plenum 2 to be mixed with the products of combustion emitted from the combustor. Inlet 6 can be disposed, relative to heat transfer surface 1a, so the gas stream emitted from combustor 3 is mixed with excess air introduced through annular inlet 6a and the resulting mixture is directed toward heat transfer surface 1a or baffle means (not shown) can be provided to uniformly distribute hot gas throughout chamber 2.

The present invention provides a cooking device which can include a liquid fuel burning heat source where the rate of supply of fuel to the heat source is uniform, within limits as hereinafter described, so the potental heat input to the cooking device is substantially constant and the temperature within chamber 2 is determined by the relative quantity of tempering air introduced to dilute the hot gases emitted from the combustor. In some arrangements, the operation of combustor 3 is significantly affected by the quantity of air drawn through inlet 6. Various combustor configurations can be used and changing rate of air flow to the combustor does not present a serious problem in all situations. For example, in the application illustrated in FIGURE 1, where an induced draft arrangement is used, the effect of a change in fan speed and air flow rate through the fan does not affect the operation of the combustor as much as in a forced draft arrangement, not shown but hereinafter described. In cases where change in the combustion air supply rate seriously affects combustor operation, means can be provided to control the supply of combustion air to the combustor while the flow of tempering air varies directly with fan speed or, as in the example of FIGURE 1, combustor 3 can be of a type which is relatively unaffected by change in combustion air flow rate. For example, combustor 3 can be similar to that described in my co-pending application Ser. No. 557,493, filed June 14, 1966 where the operation of the combustor is relatively unaffected by variation in the flow rate of air admitted to an inlet 6 of a casing 1.

As shown in FIGURE 2 and described in more detail in the co-pending application, combustor 3 includes a casing 28 having an annular inlet 7 and an outlet 27a which is adapted to receive at least two combustion chambers 11 and 12. Combustion chambers 11 and 12 are defined by perforated cylindrical casing 20 and 23, respectively, and the chambers are disposed in casing 28 in longitudinally aligned relation with outlet 27a of casing 28. A perforated cylindrical casing 17 having a diameter greater than the diameter of casing 20 is disposed in longitudinally aligned surrounding relation with casing 20 so an annular chamber 14 is formed between casing 17 and casing 28 and a second annular chamber 39 is formed between casing 17 and 20. Casing 17 includes web means 17b adjacent inlet 7 which extend from casing 17 to casing 28 to hold one end of casing 17 in position.

A perforated cap means 32 is adapted to be fitted on one end of casing 20 and receive a fuel spray nozzle 13, as shown, while a second cap 31b is provided to be fixed to casing 17 to hold cap 32 in aligned relation with chamber 11. A perforated plate 32a is disposed generally transversely across casing 20 adjacent nozzle 13 so that a spray 33 of fuel emanating from nozzle 13 passes through a central orifice of plate 32a and is sprayed into casing 11.

Combustion chamber supports 10 and 25 are provided and are adapted to hold ends of casings 20, 17, and 23 in aligned cooperative relation in casing 28. It will be noted that support 25 includes a central restrictive orifice 25a and the area of orifice 25a is advantageously less than the area of chamber 11. Support 25 is fixed in casing 28 so orifice 25a is positioned in generally aligned relation with both chambers 11 and 12 to provide an opening therebetween for the flow of gas from chamber 11 to chamber 12. Support block 10 includes a central orifice 27 to communicate with outlet 27a of casing 28 and provide a gas flow outlet from chamber 12. Support 25 is maintained in casing 28 by means of radially extending webs 15 and is adapted to provide air passages between the webs to permit air flow from inlet chamber 14 to annular chamber 16 defined between casings 23 and 28.

In operation, fuel is provided to nozzle 13 through conduit 3a from a source (not shown) at a relatively constant rate and, as hereinbefore described, the fuel is sprayed through central opening of perforated plate 32a into chamber 11.

Combustion air enters combustor 3 through inlet 7 indicated by the arrows in FIGURE 2, and a portion flows to chamber 11 through ports 17a of casing 17 and ports 21 of casing 20. The portion of the combustion air which is not supplied to chamber 11 passes through the passages between webs 15 of support block 25 to annular chamber 16 and then into chamber 12 through openings 22 of casing 23. The relative quantities of air introduced into chambers 11 and 12 varies with the pressure in chamber 11, as more fully described in my co-pending application as hereinbefore noted.

Briefly, as the pressure in chamber 11 is increased, for example in response to increased combustion temperature, the pressure differential between chamber 11 and 29 is decreased so less air is introduced to chamber 11 and more air flows to chamber 16. The increased pressure in chamber 11 increases the velocity of gas flow through restrictive orifice 25a providing a venturi effect at the outlet of orifice 25a to reduce the pressure at the inlet to chamber 12 so additional combustion air is drawn from chamber 16 to chamber 12 through opening 22 of casing 23. It has been found that, at a constant fuel supply rate, operation of the combustor as shown in FIGURE 2 is relatively unaffected by an increase in the quantity of combustion air introduced through inlet 7 because the increased air flow is balanced between chambers 11 and 12 in proportion to the flow resistance encountered by the air stream passing to the different chambers. Since the resistance encountered by the air stream passing from chamber 14 to chamber 11 is greater than the air flow resistance encountered between chambers 14 and 12, and since increased gas flow through chamber 11 decreases the pressure in chamber 12 to draw additional combustion air to chamber 12, most of the extra air flow is received by chamber 12 and very little goes to chamber 11. It will be further noted that by controlling the flow of air to chamber 11 the temperature in the chamber is relatively constant so problems such as carbon deposition and smoking associated with incomplete combustion which result from the cooling effect of excess air normally encountered in previous combustion chambers, are eliminated. In some cooking applications, as hereinafter described, it is desirable to increase fuel supply rate to increase the combustion rate in chamber 11. A portion of the increased combustion resulting from the increased fuel then occurs in chamber 12 and is supported by the extra air admitted to chamber 12.

In operation of the cooking device shown in FIGURE 1, combustion products from burner 3 are directed into chamber 2 and air is drawn into inlet 6 of casing 1 as hereinbefore described. A portion of the air enters the combustion air inlet 7 of burner 3 to provide a combustible fuel-air mixture in the combustion chamber and a second portion of the air passes through opening 6a directly into chamber 2 to be mixed with the products of combustion emitted from combustor 3. In the example of FIGURE 1, the rate of flow of air admitted to inlet 6 is controlled directly by the speed of blower 5.

As shown in the example of FIGURE 1, an induced draft fan arrangement can be used to provide combustion air to combustor 3. It will be noted that in such an arrangement the air pressure at the inlet of combustor 3 is less affected by change in the rate of flow of gas through fan 5 than when a forced draft fan is used because with the induced draft fan arrangement the inlet air pressure is nearly atmospheric. On the other hand, if a forced draft fan arrangement is used, the combustion air inlet pressure, and air flow rate to combustor 3, is a more direct function of the speed of the fan so a change in fan speed has a geater effect on operation of the combustor.

In the example of FIGURE 1, blower 5 is driven by a variable speed motor. A temperature responsive speed controller 7 is included in power source 9 to regulate the speed of fan 5 to control the quantity of air drawn through inlet 6 to combustor 3 and the quantity of tempering air supplied to chamber 2. The temperature at surface 1a is sensed by thermal element 8 and transmitted to controller 7 which can be, for example, a rheostat to regulate the power supply to fan 5 and the speed of fan 5 in accordance with the temperature of cooking surface 1a.

For example, when the temperature at surface 1a is increased above the desired temperature the speed of fan 5 is increased to draw additional tempering air through inlet 6, and when surface 1a is below the desired temperature, the speed of fan 5 is decreased so less tempering air is provided to be mixed with products of combustion from combustor 3.

It has been recognized that the present invention provides an advantageous arrangement to control cooking surface temperature over a wide temperature range and requires no complicated fuel control means to continuously modulate the fuel supply to the best source. In some applications it is desirable to provide an apparatus where the fuel supply rate is virtually constant over the entire temperature range and all of the temperature variation and control is accomplished by varying fan speed. It will be noted that within the scope of the present invention the flow rate of the fuel can be varied in stepwise fashion so continuous flow modulation over a wide range is not necessary but the fuel supply rate can be selectively changed to reduce the capacity and power requirements of the fan used to supply combustion air and tempering air to inlet 6. For example, in an apparatus where the temperature at the cooking surface is to be controlled in the 200–600° F. temperature range, fuel can be supplied to the combustor at a given rate, for example through valve 3b, for temperatures in the 200–300° F. range and the capacity of fan 5 can be adapted to supply a quantity of air sufficient to regulate temperature within the 100° F. temperature range. Then, for a higher temperature range, for example between 300 and 400° F., the fuel supply is increased in a stepwise change, as opposed to a continuous change, by opening a second valve 3c. Since the temperature is still to be controlled within a 100° F. temperature range, albeit a higher range i.e. (300–400° F. as opposed to 200–300° F.), additional fan capacity is not required and the fan speed can be varied to regulate the rate of supply of tempering air and control the temperature at the selected value within the 100° F. range. The operation of fuel supply valves 3b, 3c, and 3d can be interrelated with the operation of temperature controller 7 so manual operation of the valves is not necessary.

The invention claimed is:

1. A cooking device including: a casing defining a chamber, said casing having gas inlet means, gas outlet means and one surface to be used as a cooking surface where heat is transfered from said chamber to said surface; liquid fuel burning combustor means disposed to emit hot gases and combusion products into said chamber to provide heat; fan means to provide tempering air through said inlet means where said tempering air is mixed with said products of combustion to said chamber; and, cooking surface temperature control means to selectively control the temperature at said surface including temperature responsive control means to regulate the rate of delivery of tempering air in response to change in temperature at said cooking surface.

2. The cooking device according to claim 1 including means to vary the speed of said fan means to selectively control the quantity of air provided by said fan means wherein said temperature control means includes means to vary the speed of said fan means in response to change in temperature at said cooking surface.

3. The cooking device according to claim 1 including fuel supply means to provide fuel to said combustor means and fuel supply control means to increase fuel supply rate in incremental quantities in response to selected change in temperature desired at said cooking surface.

4. The cooking device of claim 1 wherein the diameter of said inlet means is greater than the diameter of said combustor and said combustor means is disposed within said inlet means to form an annular air passage between said combustor means and said inlet means so a portion of the air stream is passed through said annular passage to said chamber to be mixed with gases and products of combustion emitted from said combustor means.

5. The cooking device of claim 1 wherein said fan means is communicatively connected to said outlet of said casing to draw air into said chamber inlet and withdraw gases and products of combustion from said chamber defined by said casing.

6. The cooking device of claim 1 wherein said fan means is communicatively connected to said inlet means of said casing to provide air to said inlet means at greater than atmospheric pressure.

7. The cooking device of claim 1 wherein said fuel burning combustor comprises: a first housing means and defining a first chamber having fuel and air inlet means and outlet means; fuel feeding means adjacent said first housing inlet means to provide fuel to said first chamber; fuel ignition means; first housing air supply means to provide combustion air to said first chamber; orifice means having an aperature smaller than said first chamber outlet disposed in axial alignment and communicative relation with said first housing outlet to receive combustion gases from said first chamber; second housing means, defining a second chamber, having an inlet disposed in axial alignment and communicative relation with said orifice means to receive combustion products from said orifice means and a second housing outlet for emission of combustion products from said second chamber; second housing air supply means to provide combustion air to said second chamber; and, primary combustion air chamber means communicating with said first housing air supply means and said second housing air supply means to provide combustion air to said first and second chambers so air flow is apportioned between said chambers in accordance with pressure in said first and second chambers.

References Cited

UNITED STATES PATENTS

| | | |
|---|---|---|
| 2,806,465 | 9/1957 | Hess. |
| 2,870,829 | 1/1959 | Williams. |
| 3,033,463 | 5/1962 | Doner et al. |
| 3,241,542 | 3/1966 | Lotter _____ 126—15 X |

CHARLES J. MYHRE, *Primary Examiner.*